(12) United States Patent
Khosravy et al.

(10) Patent No.: US 9,032,546 B2
(45) Date of Patent: May 12, 2015

(54) ENFORCING CONDITIONS OF USE ASSOCIATED WITH DISPARATE DATA SETS

(71) Applicant: Microsoft Corporation, Redmond, WA (US)

(72) Inventors: Moe Khosravy, Bellevue, WA (US); Roger Soulen Mall, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/085,485

(22) Filed: Nov. 20, 2013

(65) Prior Publication Data

US 2014/0149589 A1 May 29, 2014

Related U.S. Application Data

(63) Continuation of application No. 12/815,573, filed on Jun. 15, 2010, now abandoned.

(60) Provisional application No. 61/312,364, filed on Mar. 10, 2010.

(51) Int. Cl.
*H04L 12/911* (2013.01)
*G06Q 10/10* (2012.01)
*G06Q 50/18* (2012.01)

(52) U.S. Cl.
CPC .............. *H04L 47/70* (2013.01); *G06Q 10/10* (2013.01); *G06Q 50/18* (2013.01)

(58) Field of Classification Search
USPC .......................................................... 726/28
See application file for complete search history.

(56) References Cited

U.S. PATENT DOCUMENTS

| | | | |
|---|---|---|---|
| 5,638,443 A | 6/1997 | Stefik et al. | |
| 5,715,403 A | 2/1998 | Stefik | |
| 6,920,567 B1* | 7/2005 | Doherty et al. | 726/22 |
| 7,031,943 B1 | 4/2006 | James et al. | |
| 7,092,953 B1 | 8/2006 | Haynes | |
| 7,530,016 B2 | 5/2009 | Sahota et al. | |
| 7,577,999 B2* | 8/2009 | Narin et al. | 726/27 |
| 8,370,954 B2* | 2/2013 | Takahashi | 726/27 |
| 2002/0154157 A1 | 10/2002 | Sherr et al. | |

(Continued)

FOREIGN PATENT DOCUMENTS

| | | |
|---|---|---|
| CN | 1971576 A | 5/2007 |
| CN | 101221566 A | 7/2008 |
| KR | 1020070075048 A | 7/2007 |

OTHER PUBLICATIONS

Boldt et al., "Automated Spyware Detection Using End User License Agreements", 2008, 1-8 pages.*

(Continued)

*Primary Examiner* — Yonas Bayou
(74) *Attorney, Agent, or Firm* — Timothy Churna; Kate Drakos; Micky Minhas

(57) ABSTRACT

Techniques are described herein that are capable of enforcing conditions of use associated with disparate data sets. For example, content may be published. Conditions of use that are associated with the published content may be specified. The published content may include disparate data sets. Each data set may be associated with its own condition(s) of use. The condition(s) of use associated with each data set may be enforced.

29 Claims, 11 Drawing Sheets

(56) References Cited

U.S. PATENT DOCUMENTS

| | | | |
|---|---|---|---|
| 2005/0197906 | A1 | 9/2005 | Kindig et al. |
| 2006/0161965 | A1* | 7/2006 | Shelest et al. ............... 726/1 |
| 2006/0230124 | A1* | 10/2006 | Belfiore et al. ............ 709/219 |
| 2007/0083474 | A1 | 4/2007 | Burkhart et al. |
| 2007/0083926 | A1* | 4/2007 | Burkhart et al. ............ 726/21 |
| 2007/0250448 | A1 | 10/2007 | Burkhart et al. |
| 2008/0005032 | A1* | 1/2008 | Znidarsic .................. 705/59 |
| 2008/0022373 | A1* | 1/2008 | Takahashi ................ 726/4 |
| 2008/0083025 | A1* | 4/2008 | Meijer et al. ............... 726/9 |
| 2008/0083040 | A1* | 4/2008 | Dani et al. ................ 726/28 |
| 2009/0007096 | A1* | 1/2009 | Chavez et al. ............. 717/176 |
| 2009/0228985 | A1* | 9/2009 | Maurer .................... 726/26 |
| 2009/0265180 | A1 | 10/2009 | Ellison et al. |
| 2009/0276333 | A1 | 11/2009 | Cortes et al. |
| 2010/0293622 | A1* | 11/2010 | Nikitin et al. .............. 726/31 |
| 2011/0225658 | A1 | 9/2011 | Khosravy et al. |

OTHER PUBLICATIONS

Carlsson et al., "Privacy-Invasive Software and Preventive Mechanisms", 2006, 1-7 pages.*

International Search Report received for PCT Patent Application No. PCT/US2011/027305 mailed on Nov. 15, 2011, 8 pages.

Gaedke et al., "Aspects of Service-Oriented Component Procurement in Web-Based Information Systems", International Journal of Web Information Systems, vol. 1, Iss: 1, published: 2005, pp. 15-24.

Gomulkiewicz, "Getting Serious about User-Friendly Mass Market Licensing for Software", Published: 2003, pp. 687-718.

De Rosnay, "Cognitive Interfaces for Legal Expressions Description—Application to Copyrighted Works Online Sharing and Transactions", Published: 2003, pp. 121-130.

Armintor et al., "NHSE Distribution of HPCC Software: Legal Issues and Technological Options", Published: Sep. 28, 1997, 18 pages.

"Open Data Protocol", retrieved from <www.odata.org>, last accessed on Mar. 9, 2010, 1 page.

"Windows Azure Platform", retrieved from <http://www.microsoft.com/windowsazure/developers/dallas>, last accessed on Mar. 9, 2010, 2 pages.

Search result from the U.S. examiner dated Jun. 8, 2012.

"Patent Examination Report No. 1" received for Australian Patent Application No. 2011224649, Mailed Date: Feb. 24, 2014, 5 Pages.

"Second Office Action Issued in Chinese Patent Application No. 201180012976.5", Mailed Date: Nov. 5, 2013, Filed Date: Mar. 4, 2011, 8 Pages.

"Third Office Action and Search Report Issued in Chinese Patent Application No. 201180012976.5", Mailed Date: May 20, 2014, Filed Date: Mar. 4, 2011, 12 Pages.

"Search Report Issued in European Patent Application No. 11753852.0", Mailed Date: Oct. 10, 2013, Filed Date: Mar. 4, 2011, 4 Pages.

* cited by examiner

ENFORCING CONDITIONS OF USE ASSOCIATED WITH DISPARATE DATA SETS

CROSS-REFERENCE TO RELATED APPLICATIONS

This application is a continuation of U.S. patent application Ser. No. 12/815,573, filed Jun. 15, 2010, which is titled "End User License Agreement On Demand" and which claims the benefit of U.S. Provisional Patent Application Ser. No. 61/312,364, filed Mar. 10, 2010, which is titled "End User License Agreement On Demand." The entire contents of U.S. patent application Ser. No. 12/815,573 and U.S. Provisional Patent Application Ser. No. 61/312,364 are incorporated herein by reference.

TECHNICAL FIELD

The subject disclosure relates to end user license agreements (EULAs), and more specifically, to providing EULAs on demand for third-party content.

BACKGROUND

Currently, no cloud service or network service provider can effectively provide information as a service on any platform such that publishers, developers, and consumers/subscribers can easily publish, generate applications for and consume any type of data in a way that can be tracked, audited for publishers, developers and/or consumers/subscribers and such that publisher restrictions on the use of content can be enforced. Further, restrictions on the use of content are typically negotiated by content negotiators (e.g., attorneys). As such, terms and conditions tend to be content-specific and vary widely in language and complexity. As such, no single system can currently receive and enforce the customized terms and conditions provided for disparate content. Additionally, terms and conditions that are presumably similar or the same are often unrecognizable as such by a human or a single system processing and attempting to enforce the customized terms.

The above-described deficiencies of today's services are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of one or more of the exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Various approaches are described herein for, among other things, enforcing conditions of use associated with disparate data sets. An example method is described. In accordance with the method, content is published to provide published content that includes disparate data sets. Conditions of use that are associated with the published content are specified. Each data set is associated with its own condition(s) of use. The condition(s) of use associated with each data set are enforced.

An example system is described. The system includes a publication module, a condition generation module, and an enforcement module. The publication module is configured to publish content. The condition generation module is configured to specify conditions of use that are associated with published content from the publication module. The published content includes disparate data sets. Each data set is associated with its own condition(s) of use. The enforcement module is configured to enforce the condition(s) of use that are associated with each data set.

An example computer-readable storage medium is described. The computer-readable storage medium has instructions stored thereon that, when executed, cause a processor to perform functions. The functions include publishing content to provide published content that includes disparate data sets. The functions further include specifying conditions of use that are associated with the published content. Each data set is associated with its own condition(s) of use. The functions further include enforcing the condition(s) of use that are associated with each data set.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

The following description contains context regarding potential non-limiting infrastructure, architectures and/or associated services to further aid in understanding one or more of the above embodiments. Any one or more of any additional features described in this section can be accommodated in any one or more of the embodiments described above with respect to dynamically generating an end user license agreement (EULA) for third-party content. While such combinations of embodiments or features are possible, for the avoidance of doubt, no embodiments set forth in the subject disclosure should be considered limiting on any other embodiments described herein.

Figure 1:
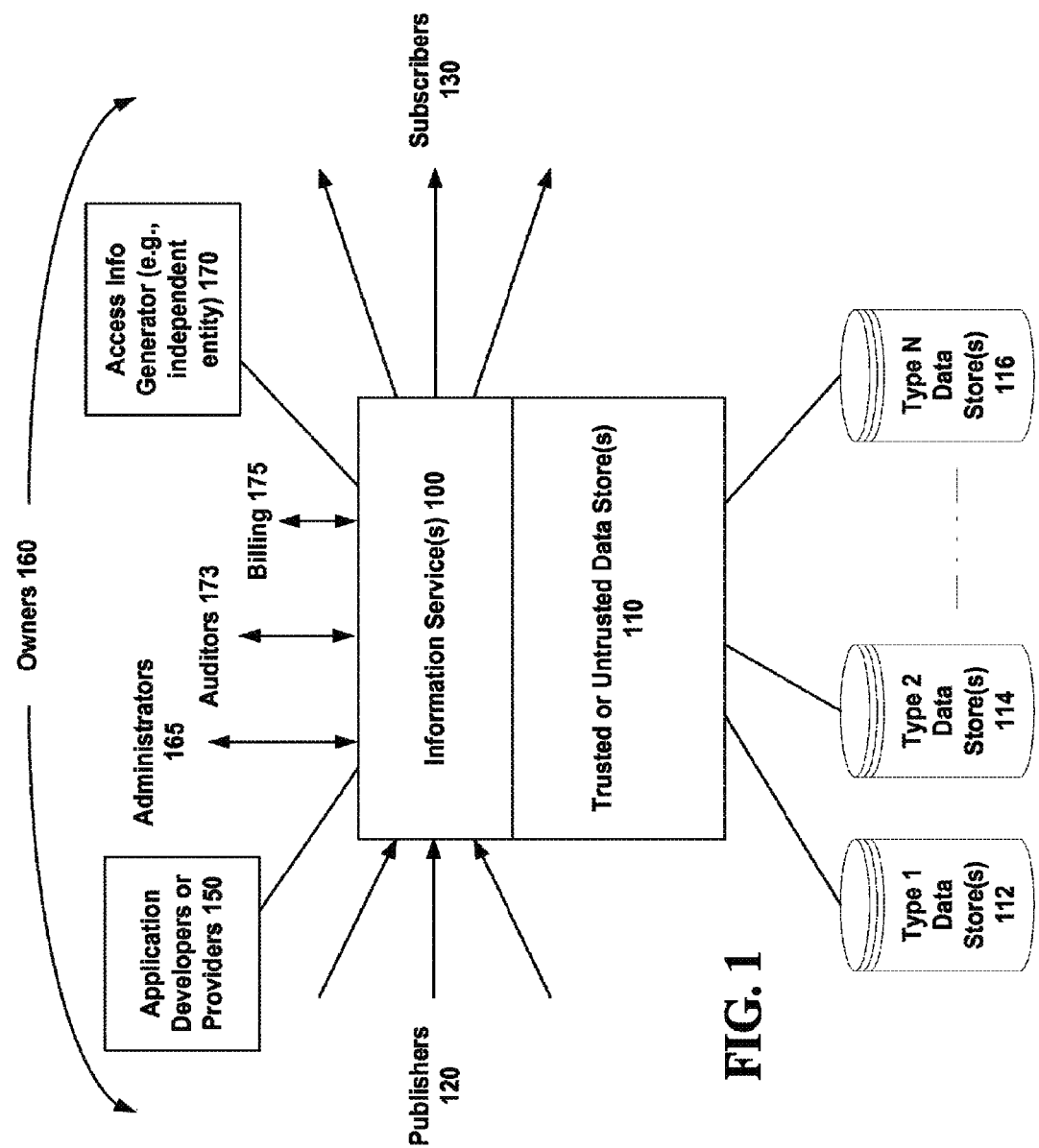
FIG. 1 is a block diagram illustrating an exemplary non-limiting infrastructure for information provided as a service from any platform.

FIG. 1 is a block diagram illustrating an exemplary non-limiting set of implementation specific details for an infrastructure for information provided as a service from any platform. FIG. 1 generally illustrates the various parties that may participate in an ecosystem providing information as a service as described herein. For instance a set of network accessible information services 100 provide access to a variety of trusted or untrusted data stores 110, depending on the sensitivity or other characteristics of the data. As shown, thus, what type of data store, 112, 114, . . . , 116 is not so important since the ecosystem supports any kind of data, blob, structured, unstructured, etc. As mentioned, the system includes publishers 120 that add data to the ecosystem, subscribers 130 that consume the data and application developers or providers 150 who can consume the data with their applications. An access information generator 170 can also govern access to the data by various parties through maintaining or enforcing account information, key information, etc. In this respect, content owners 160 can span any of the roles in that a content owner 160 can be a publisher 120, a subscriber 130 and/or an application developer as well. In one aspect, the common infrastructure for all parties enables administration 165, auditing 173, billing 175 as well as other desired ancillary services to the data transactions occurring across the infrastructure.

In this regard, various embodiments for the user friendly data platform for enabling information as a service from any platform is an infrastructure to enable consumers of data (Information Workers (IWs), developers, independent software vendors (ISVs)) and consumers of data to transact in a simple, cost effective and convenient manner. The infrastructure democratizes premium (private) and community (public) data in an affordable way to allow IWs to draw insights rapidly, allows developers to build innovative apps using multiple sources of data in a creative manner and enables developers to monetize their efforts on any platform. For instance, the infrastructure supports Pay Per Use as well as Subscription Pricing for Content, Pay for Content ("retail price"—set by content owner), Pay Data Fee ("Shipping and Handling"), and further supports Data fees as a brokerage fee on a per-logical transaction basis (per report, per application program interface (API), per download, etc.).

For Information Workers (e.g., OFFICE®, SQL SERVER®, MICROSOFT DYNAMICS® users), the infrastructure supports subscriptions to allow for future enterprise architecture (EA) integration as well as predictable spend requirements (as well as caching to support on and off-premise Business Intelligence (BI) as well as high performance computing (HPC) workloads). Thus, alternatives include content priced per-user per-month; which may or may not bundle to deliver content packs or per-transaction pricing, e.g., allowing cloud reporting/business intelligence on-demand pricing to eliminate the need to move large amounts of data while allowing per-usage pricing, or vertical apps via report galleries.

For data owners (any data type; any cloud), using any platform, the infrastructure becomes a value proposition to incent sales within any particular desired platform; auto-scaling, higher level service level agreement (SLA) possibilities at no additional cost. For some non-limiting examples, data can be secure and associated data in the following domains: Location aware services & data, Commercial and residential real estate, Financial data and services, etc. A non-limiting scenario may include delivery of data to top 30 non-governmental organization (NGO) datasets. In addition, the infrastructure may include the ability to showcase BI & visualization through BING™ for information as a service, HPC, etc. Vertical application opportunities exist as well.

In one non-limiting embodiment, the data brokerage can be analogized to conventional brick and mortar strategies: For instance, capacity can be represented as shelf space (e.g., a mix of structured and unstructured/blob data), cost of goods (COGS) can be represented as square footage (e.g., platform dependency, bandwidth) and content can be represented as merchandise (e.g., optimize data owners to cover COGS, maximize profits from IWs and developers). In various embodiments, an onboarding process can be implemented with quality bars for data and services, as well as accommodation of service level agreements (SLAs).

Figure 2:
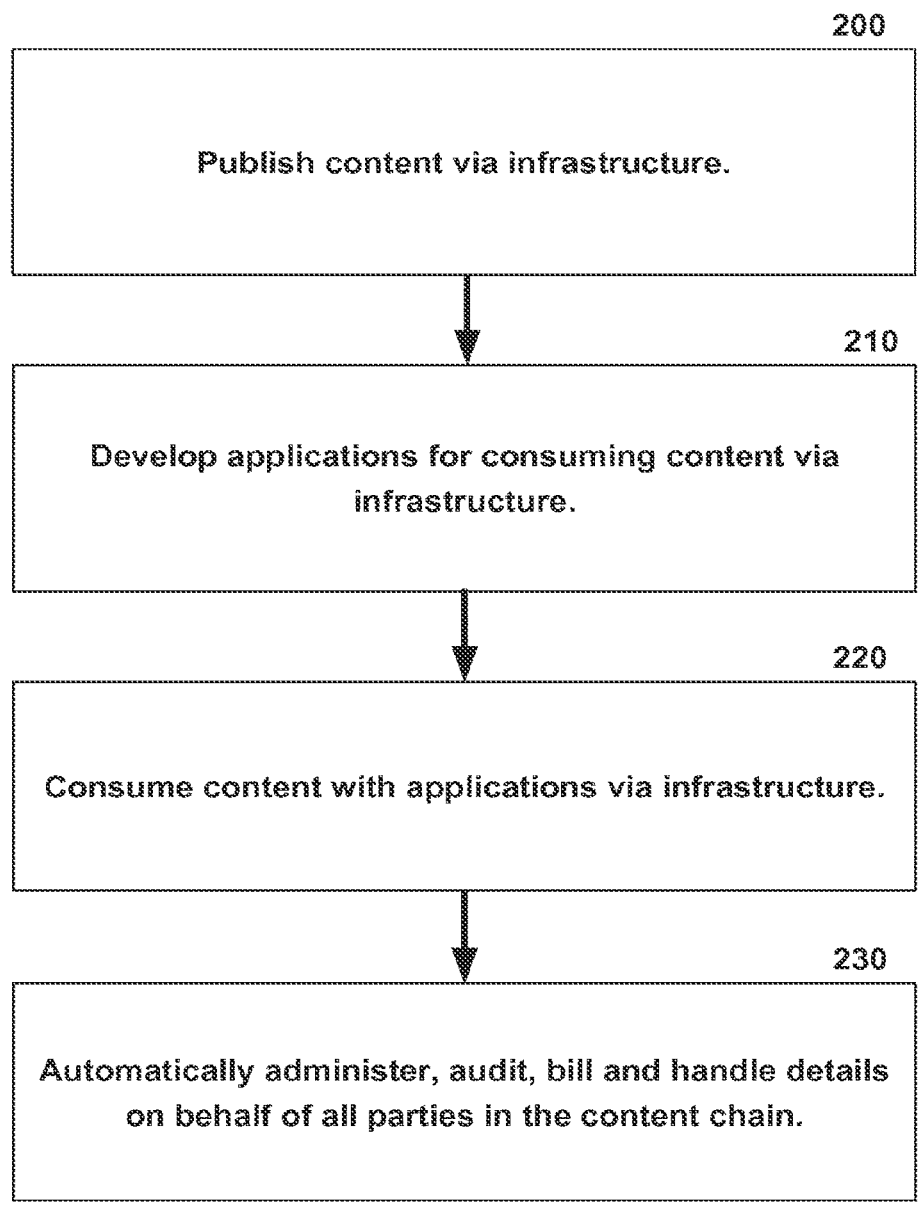
FIG. 2 is a flow diagram illustrating an exemplary non-limiting embodiment for information provided as a service from any platform.

FIG. 2 is a flow diagram illustrating an exemplary non-limiting embodiment for information provided as a service from any platform. As shown in the flow diagram of FIG. 2, at 200, described herein are various ways for content owners or publishers to publish data via the infrastructure. At 210, there are a variety of tools that allow developers to develop applications for consuming the data via the infrastructure. At 220, consumers or information workers use the applications or can directly query over the data to consume the data. Lastly, the infrastructure provides a rich variety of tools at 230 that enable automatic administration, auditing, billing, etc. on behalf of all parties in the content chain, enabled by the transaction model.

In this regard, some key parties in the infrastructure include data owners, the application developers/ISVs and the consumers/information workers. In general, data owners are entities who want to charge for data, or who want to provide data for free for other reasons, or enforce other conditions over the data. In turn, application developers/ISVs are entities who want to monetize their application (e.g., through advertising, direct payments, indirect payments, etc.), or provide their application for free for some beneficial reason to such entities. Information workers and consumers are those who can use the raw data, or those who want to use an application provided by the application developers.

Figure 3:
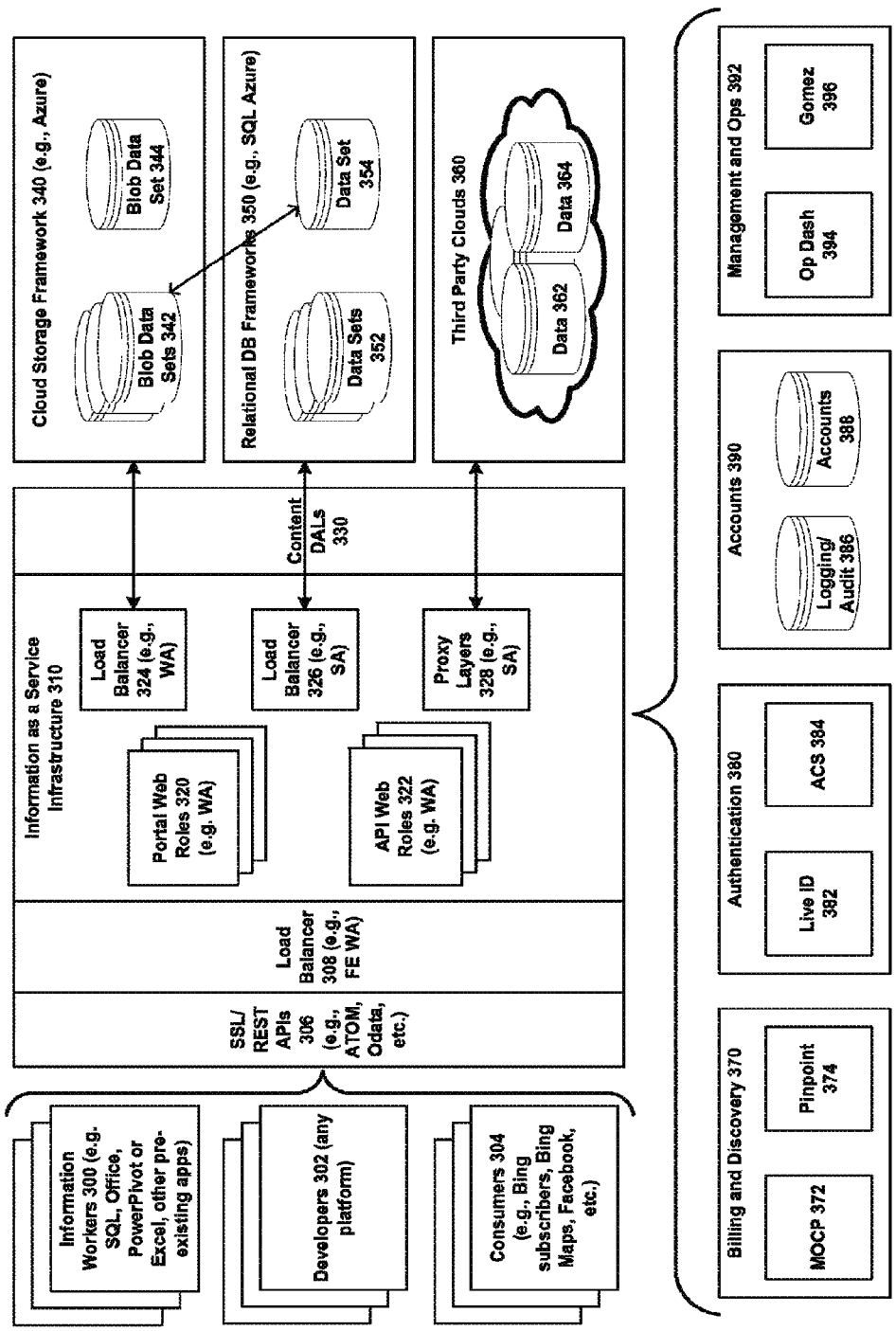
FIG. 3 is an exemplary non-limiting implementation of the infrastructure for information as a service as described above according to one or more features.

FIG. 3 is an exemplary non-limiting implementation of the infrastructure 310 for information as a service as described above according to one or more features. At the interaction side are information workers 300, developers 302 and consumers 304 who can communicate with the infrastructure via secure sockets layer (SSL)/representational state transfer (REST) based APIs 306. A load balancer 308 can be used to help steer traffic in an optimal way. In this regard, the input is routed to portal web roles 320 or API web roles 322. From the infrastructure 310 to the data side is additional load balancing 324 or 326 for access to blob data sets 342, or blob data set 355 of cloud storage framework 340, or to data sets 352 or data set 354 of relational database frameworks 350. Proxy layers 328 can be used to access data 362 or data 364 of third party clouds 360. Content data abstract layers (DALs) 330 can be used to access content, where applicable. In this regard, there can be duplication or overlap of data sets across different types of storage, e.g., the same data might be represented as blob data and as structured data, e.g., SQL SERVER®.

As supplemental services to the data, billing and discovery services 370 can include online billing 372 (e.g., MICROSOFT® Online Customer Portal (MOCP)) or discovery services 374 (e.g., pinpoint) and authentication services 380 can include credentials management 382 (e.g., MICROSOFT® Windows Live ID) or content authentication 384, e.g., authenticated content services (ACS). Accounts services 390 can include logging/audit services 386 or account management 388. Management and operations services 392 can include an operations dashboard service 394 and network operations service 396, e.g., Gomez.

Figure 4:
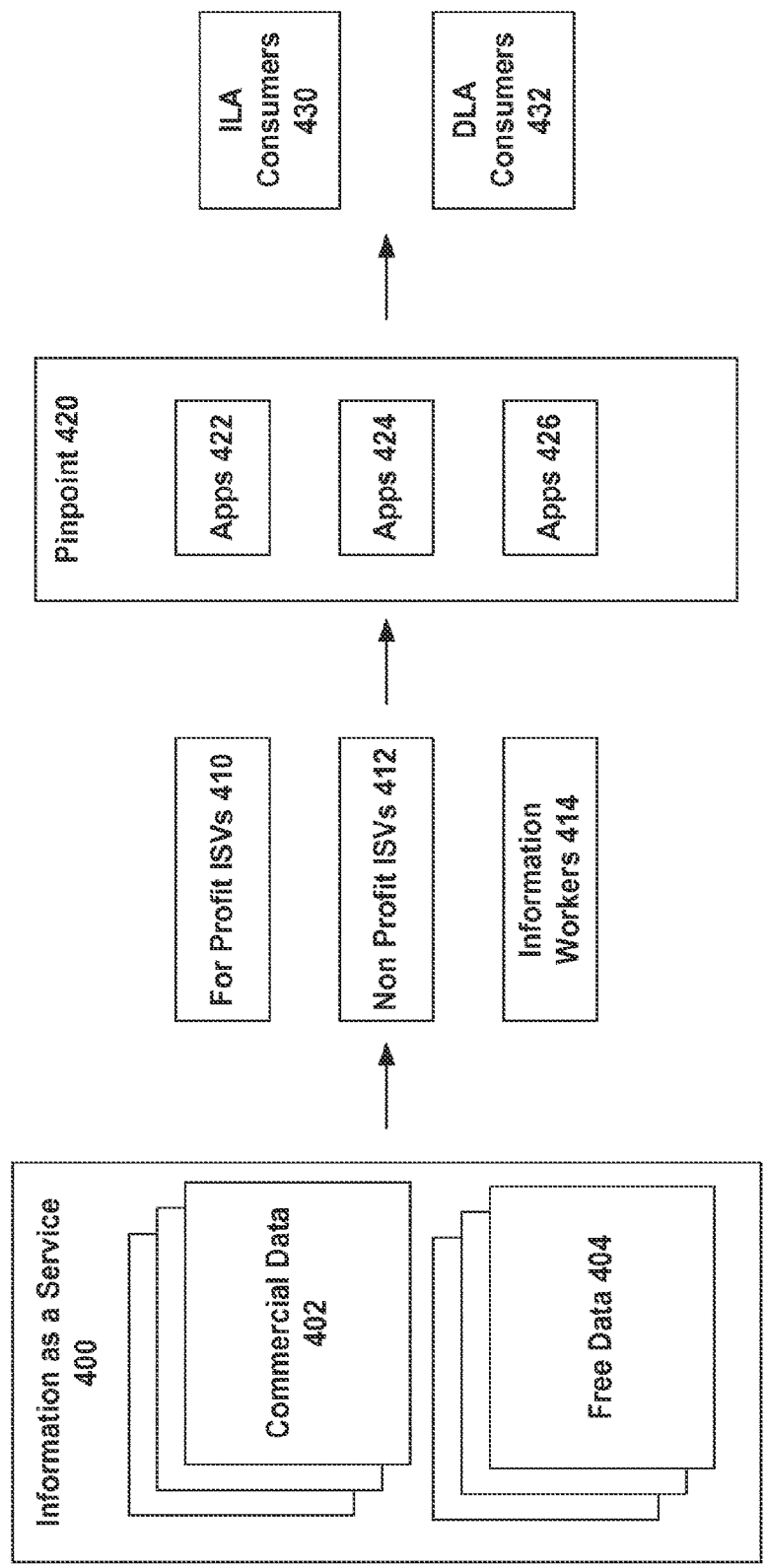
FIG. 4 is a block diagram illustrating an exemplary end to end flow diagram from data to consumers of the data for enabling information as a service from any platform.

FIG. 4 is a block diagram illustrating an exemplary end to end flow from data to consumers of the data in accordance with one or more embodiments of the general infrastructure for enabling information as a service. For instance, information as a service 400 can include commercial data 402 and free data 404, which can be of interest to various for profit developers 410, nonprofit developers 412 with non-profit motives and other information workers 414 who are interested in consuming the data generally for productive goals. These entities can use discovery services 420 to determine what applications 422, 424, . . . , 426 may be of interest to them, and to ultimately transmit the data to indirect license acquisition (ILA) consumers 430 and direct license acquisition (DLA) consumers 432 alike.

Figure 5:
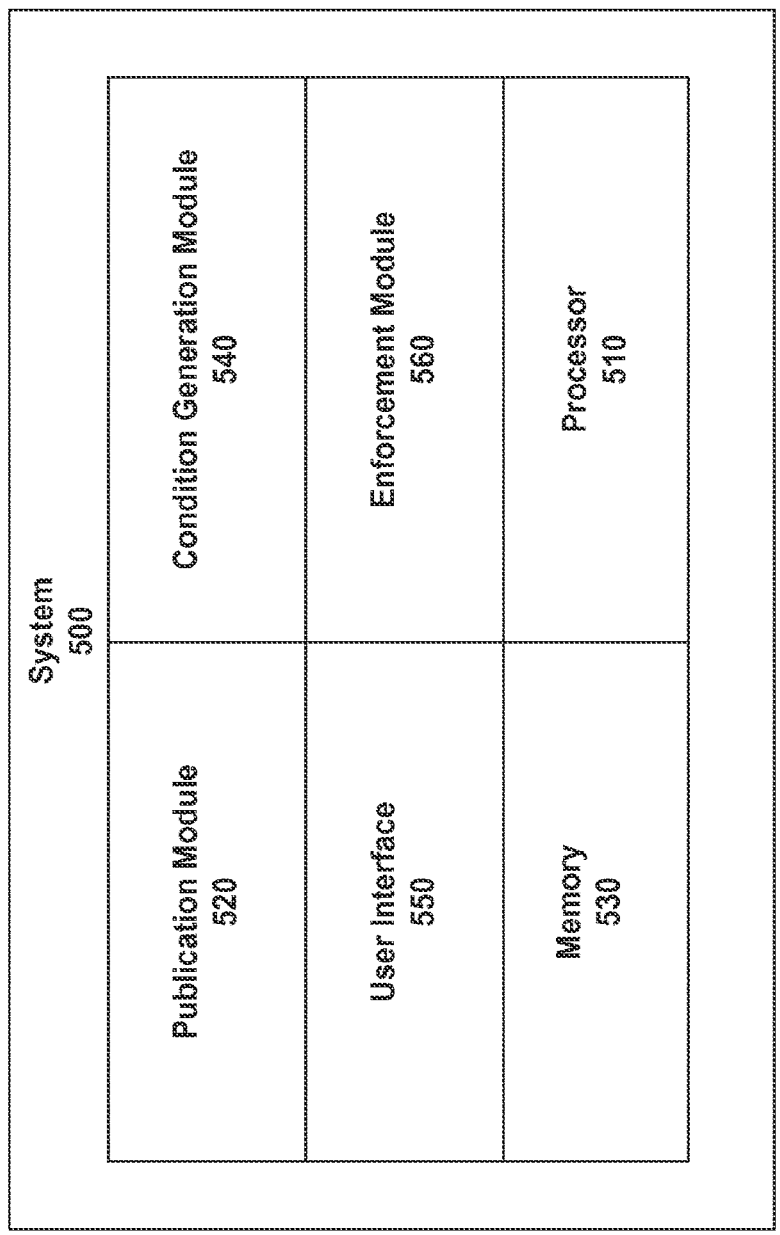
FIG. 5 is a block diagram illustrating an exemplary computing system for generating a EULA on demand as information as a service from any platform.

FIG. 5 is a block diagram of a system for providing a EULA on demand for third-party content as described herein. The system 500 will be described with reference to FIGS. 1, 3, 4 and 5. In some embodiments, the system 500 can be part of the information service 200 illustrated in FIG. 2.

The system can include a processor 510, a publication module 520, a memory 530 and a condition generation module 540. In some embodiments, the system can also include a user interface 550 and/or an enforcement module 560.

The processor 510 can be configured to execute computer-readable instructions stored in the memory 530 and perform one or more functions of the system 500 described herein.

The publication module 520 can be configured to published content and output the published content from the publication module 520 for experience by a consumer 304. The published content can include, but is not limited to, data in the data stores 212, 214, . . . , 216 and/or commercial data 402 owned or controlled by owners 260. In various embodiments, the owners 260 can be third-party content owners.

The condition generation module 540 can be configured to generate a representation of one or more conditions associated with use of the published content. The representation can be a EULA on demand generated visually and/or in audio format for review and acceptance by the consumer 304 prior to experience of the published content by the consumer 304.

In some embodiments, the one or more conditions included in the EULA can be or be indicative of disallowed activity in some embodiments. By way of example, but not limitation, the one or more conditions can be indicative of disallowed printing, downloading, dissemination, rendering, copying activity or any other disallowed activity.

In some embodiments, some of the conditions can be canonicalized such that similar or the same language is used for similar or the same disallowed activity. In some embodiments, some of the conditions can be stored in the system 500 as non-standard terms that are not canonicalized. Such non-standard terms can be included in the EULA using the free form text input to the system 500 by a third-party content owner generating the EULA for the published content.

Because the sentences and/or phrases making up the conditions can be canonicalized, the EULA conditions for any number of different media owned by different third-parties can have a recognizable degree of uniformity. As such, the complexity of terms and presentation format in the EULAs output from the system 500 for different third-parties can be reduced.

In some embodiments, the condition generation module 540 can include or be operably coupled to a taxonomy module (not shown) configured to classify the one or more conditions. The conditions can be classified in a number of ways, as described below, including, but not limited to, according to a type of the content, a disallowed activity and/or can include a hierarchy of condition, or term, definitions.

In various embodiments, the conditions can be classified by the type of the published content. For example, particular conditions can be typically employed for typical types of content. Such particular conditions can be classified together. By way of example, but not limitation, conditions that are typically employed for electronic books can be classified in one category, conditions that are typically employed for downloadable music can be classified in another category and conditions that are typically employed for films can be classified in another category.

Accordingly, selection of the EULA condition can be based on an input solely indicative of the published content type. In some embodiments, selection of the EULA condition can include inferring a EULA condition typically suitable for inclusion in a EULA for content of the type indicated. Accordingly, EULAs can be dynamically generated to include conditions typically suitable for a particular content type, thereby increasing the likelihood of generating a more complete EULA while expending less financial and time resources.

In various embodiments, the conditions can be classified by the disallowed activity. For example, conditions related to disallowed printing and copying can be classified in a first category while conditions related to disallowed dissemination and downloading can be provided in a second category. As such, the categories can be arranged in one or more buckets that can accommodate various different conditions.

For example, selecting a EULA condition can be based on a disallowed manner of using particular content. By way of example, but not limitation, the selection can be indicative of a maximum number of times that the published content can be printed and/or whether printing privileges are provided to the consumer in general. The EULA condition can therefore be a sentence or phrase providing simple language to the consumer regarding the number of times that the content can be printed and/or that the content cannot be printed.

In some embodiments, the system 500 can be configured to receive one or more inputs from a third-party content owner, and the condition generation module 540 can determine appropriate conditions with which to publish the EULA on demand. In some embodiments, the conditions can be determined by querying over the conditions using OData or other querying protocols.

In some embodiments, the conditions can be determined based on mapping, semantics, pattern recognition or other techniques for selecting data that corresponds to an input.

The inputs can be received via the user interface 550 communicatively coupled to the system 500. In some embodiments, the user interface 550 particularly, or the system 500 generally, can be configured to receive the input for generating the EULA on demand.

The input, or selection, can be a free-form selection received in a text box displayed via the user interface 550 and/or a selection of a menu option displayed via the user interface 550. In some embodiments, the user interface can receive audio selections from third-parties. The selections can be indicative of disallowed activity and/or indicative of the content type in various embodiments. In some embodiments, the selections can be indicative of the identity of the third-party (for embodiments wherein the third-party chooses to generate EULAs that are substantially the same for all of the published content owned by the third-parties).

The system 500 can include an enforcement module 560 in some embodiments. The enforcement module 560 can be configured to enforce the one or more conditions associated with the published content, and on any platform. In some embodiments, enforcing the one or more conditions of use can include disallowing a disallowed activity indicated by the one or more conditions. In various embodiments, the enforcement module 560 can enforce the conditions of the EULA to prevent disallowed activity over MICROSOFT OFFICE® platforms, WINDOWS® platforms, SQL® platforms, MAC® platforms, and/or OPENOFFICE.ORG® platforms.

The enforcement module 560 can perform the enforcement via an information rights management module (not shown) in some embodiments. The information rights management module can be included within, or be operably coupled to, the enforcement module 560.

Referring to memory 530, in some embodiments, the memory 530 can be a computer-readable storage medium having instructions stored thereon that, when executed, cause a processor to perform a method. The method (not shown) can include: displaying an option selection representation via a user interface, wherein the option selection representation is associated with options for use of published content. The method can also include receiving an input via the user interface; and identifying one or more conditions for use with the published content based, at least, on the input, wherein the one or more conditions are end user license conditions.

In some embodiments of the computer-readable storage medium, the option selection representation comprises a text box, and wherein the receiving the input comprises receiving a free form selection input at the text box. In some embodiments of the computer-readable storage medium, the option selection representation comprises menu of options, and wherein the receiving the input comprises receiving a selection indicative of at least one option of the menu of options.

In some embodiments of the computer-readable storage medium, the method also includes receiving a selection of a type of the published content, wherein the displaying the option selection representation is based on the receiving the selection of the type of the published content.

In some embodiments of the computer-readable storage medium, the method also includes generating an end user license agreement including the end user license conditions. In some embodiments of the computer-readable storage medium, the end user license conditions are canonicalized, standard terms.

Figure 6:
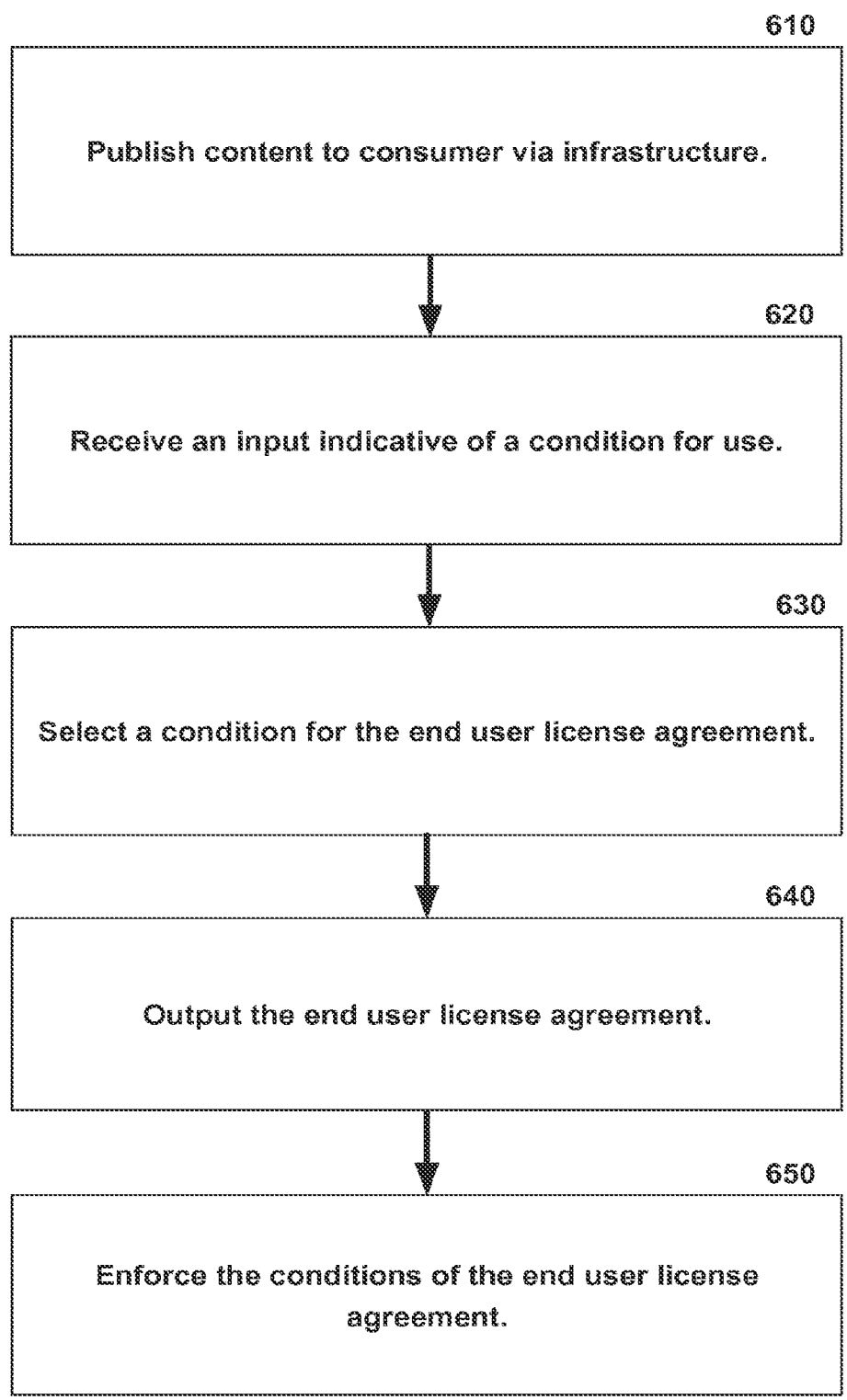
FIGS. 6 and 7 are flow diagrams illustrating exemplary non-limiting embodiments for generating a EULA on demand as information as a service from any platform.

FIG. 6 is a flowchart illustrating a method of generating a EULA on demand as information for a service on any platform according to an embodiment described herein.

At 610, method 600 can include publishing content to a consumer. The content can be any type of content owned by a third-party including, but not limited to, music, electronic books, films, video games, website or the like.

At 620, method 600 can include receiving an input indicative of a condition of use for the published content. The input can be received from an owner of the published content. The input can indicate a type of content, a disallowed activity and/or an owner of the content in various embodiments.

At 630, method 600 can include selecting a condition for the EULA based on the input received. Selecting the condition can be performing through any number of methods including, but not limited to, querying the one or more conditions to determine the condition that most closely relates to the input, mapping, pattern recognition, semantics or the like.

The conditions can be standard terms that are canonicalized or non-standard terms that are not canonicalized. The non-standard terms can result from free form text inputs or audio inputs by the content owner.

The conditions can be classified according to a taxonomy. The taxonomy can be based on a type of the content, the disallowed activity and/or the owner of the content. In various embodiments, the disallowed activity can be associated with rendering, printing, derivation, dissemination or copying.

At 640, method 600 can include outputting a representation of one or more conditions to a consumer or subscriber. The representation can be the EULA on demand in some embodiments. The representation can be visual and/or audio in different embodiments.

At 650, method 600 can include enforcing the conditions of the EULA. Enforcing the conditions of the EULA can comprise monitoring the use of the published content by the consumer and disallowed forbidden activity. In some embodiments, disallowing can include operating an information management module to prevent the disallowed activity.

Figure 7:
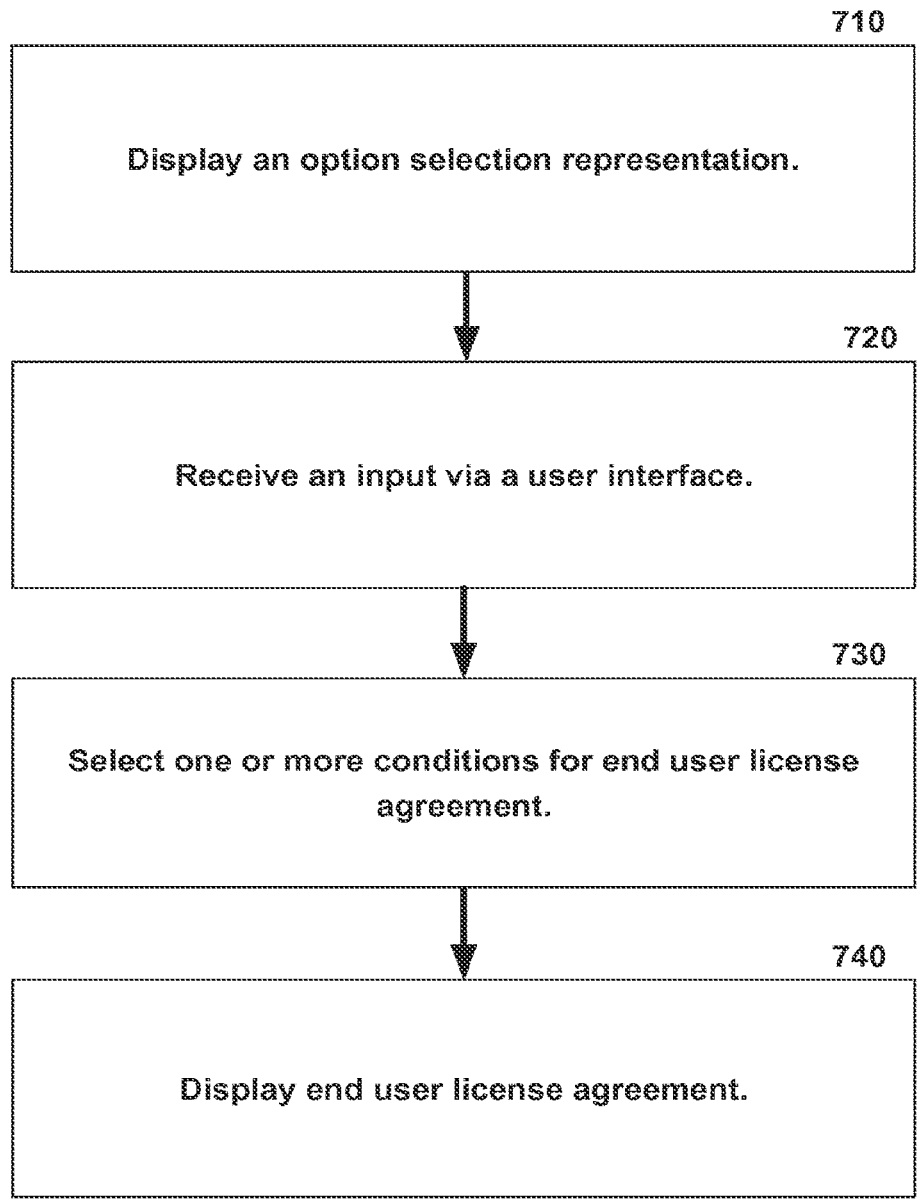

FIG. 7 is a flowchart illustrating a method according to an embodiment described herein. At 710, method 700 can include displaying an option selection representation via a user interface. The representation can be associated with determining conditions for use with published content. At 720, method 700 can include receiving an input via the user interface.

In some embodiments, the option selection representation can include a text box, and the input is a free form selection input at the text box. Identifying one or more options can include selecting the one or more options associated with the free form selection. In some embodiments, displaying the option selection representation can include displaying the one or more options as a menu of options. The input can be a menu selection from the menu of options.

At 730, method 700 can include selecting one or more conditions based, at least, on the input. The one or more conditions can be classified according to a taxonomy. In some embodiments, some of the conditions can be standard terms that are canonicalized while some of the conditions can be non-standard terms that are not canonicalized.

Selecting the one or more conditions can be performed by any known techniques including querying. Pattern recognition, semantics or the like can be employed.

At 740, method 700 can include displaying a representation of the one or more conditions selected. The representation can be the EULA on demand in some embodiments. The conditions selected can be displayed via a user interface to a third-party content owner prior to storage and/or display to a consumer using the published content.

In some embodiments, a user interface can be provided to facilitate generation of the end user license agreement. In some embodiments, the user interface can be configured to display an option selection representation. The option selection representation can include information indicative of one or more options for use of published content.

The user interface can also be configured to receive an input selecting at least one of the one or more options for use. The input can be received by an owner of the published content and/or the publisher of the content.

The user interface can also be configured to display one or more conditions for inclusion in a EULA. The conditions can be based, at least, on the input that is received.

The user interface can also be configured to display a representation of the EULA. The representation can be visual or audio in various embodiments.

In some embodiments, the option selection representation comprises a text box. In these embodiments, the input received can be free form text. In some embodiments, in addition to, or in lieu of the text box, the option selection representative can include a menu of options for use of the published content. The options can be selectable by the user providing the input.

In various embodiments, the displayed one or more conditions for inclusion in the EULA can be canonicalized, standard terms and/or conditions that are not canonicalized. For example, the conditions that are not canonicalized can be the free form text that can be received via the text box.

The user interface can provide visual and/or audio displays. In some embodiments, the user interface can receive inputs through inputs provided at the user interface screen and/or through audio signals via voice commands provided to the user interface. In some embodiments, the user interface is a touchscreen user interface.

Figure 8:
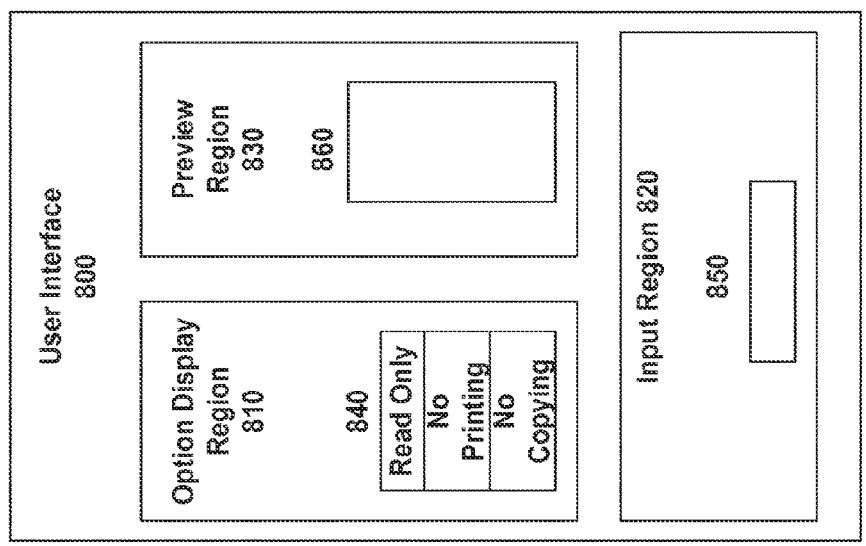
FIG. 8 is a block diagram illustrating an exemplary user interface for generating a EULA on demand as information as a service from any platform.

FIG. 8 is block diagram illustrating an exemplary user interface (UI) for generating a EULA on demand as information as a service from any platform. As shown in FIG. 8, UI 800 can include an option display region 810, an input region 820 and a preview region 830.

The option display region 810 can comprise information indicative of published content or use of the published content. In some embodiments, the information indicative of the published content is one or more types of published content. The one or more types of published content can include music, an electronic book, a film, a television show or a video game.

In some embodiments, the information indicative of the use of the published content is one or more types of disallowed activity, which can be provided at region 840. The types of disallowed activity can be indicative of at least one of editing privileges, printing, copying, writing privileges or re-distribution or dissemination rights.

The input region 820 can be configured to display a region for receiving an input. The input region can include a text box 850 or a selectable menu of options. The text box 850 can be configured to receive free form text in some embodiments. In some embodiment, the input region 820 and/or the surface of the UI 800 in totality can have touchscreen capabilities. In some embodiments, the selectable menu of options can be as shown at region 840.

The preview region 830 can be configured to display a preview of one or more conditions for inclusion in an end user license agreement. In various embodiments, at least one of the one or more conditions is canonicalized, standard terms. In various embodiments, at least one of the one or more conditions is not canonicalized, standard terms and is the free form text. In some embodiments, the preview region 830 can be configured to display a preview of the end user license agreement 860.

In some embodiments, a UI (not shown) configured to generate EULA can include an option display region that comprises information indicative of published content or use of the published content. The EULA UI can also include an input region configured to display a region for receiving an input; and a preview region configured to display a preview of one or more conditions for inclusion in an end user license agreement. The preview region can be configured to display the end user license agreement.

In some embodiments, one or more of the one or more conditions can be canonicalized, standard terms. In some embodiments, one or more of the one or more conditions is not canonicalized, standard terms and are the free form text.

In some embodiments, the option display region comprises information indicative of the published content and the information indicative of the published content is one or more types of published content.

In some embodiments, the option display region comprises information indicative of the use of the published content and the information indicative of the use of the published content is one or more types of disallowed activity. In some embodiments, one or more types of disallowed activity is indicative of at least one of editing privileges, writing privileges or re-distribution rights.

In some embodiments, one or more types of published content comprises at least one of music, an electronic book, a film, a television show or a video game.

In some embodiments, the input region comprises a text box. The text box can be configured to receive free form text. In some embodiments, the input region comprises a selectable menu of options.

In some embodiments, the UI is a touchscreen user interface.

Figure 9:
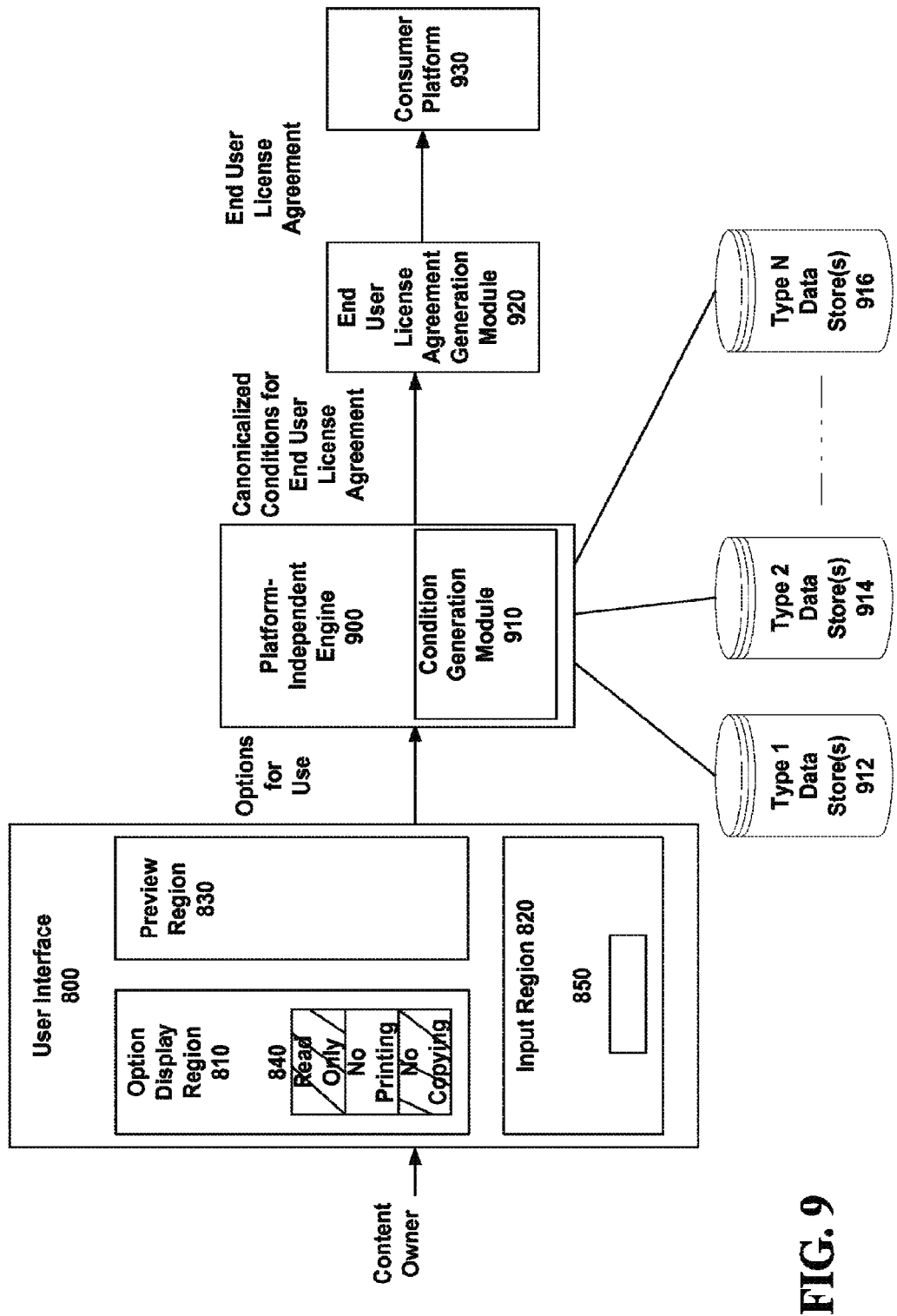
FIG. 9 is a block diagram illustrating an exemplary end to end flow diagram from content owner to consumer for generating a EULA on demand as information as a service from any platform.

FIG. 9 is a block diagram illustrating an exemplary end to end flow diagram from content owner to consumer for generating a EULA on demand as information as a service from any platform. The flow diagram shall be described with reference to FIGS. 8 and 9.

The content owner can provide selections indicative of options of use for published content owned by the content owner. The selections can be provided at a UI 800 accessible by the content owner.

The content owner can select one or more types of disallowed activity 840 from the UI 800. In the embodiment shown, the disallowed activity is editing the published content and copying the published content. As such, the content owner has selected read only privileges and no copying privileges to be associated with the published content.

The selected options for use can be received by the platform-independent engine. The platform-independent engine 900 can include a condition generation module 910 for selecting one or more conditions (which can be canonicalized, as shown in FIG. 9, or not canonicalized). The platform-independent engine 900 can include a condition generation module 910. The one or more conditions can be classified according to a selected taxonomy, which can be based on the disallowed activity, the type of the published content, the identity of the content owner or otherwise. The condition generation module can select the one or more conditions associated with the options for use from the data stores 912, 914, . . . , 916.

The EULA generation module 920 can receive the conditions for the EULA and generate the EULA, including the conditions received. The consumer platform 930 can receive the EULA and display the EULA to the consumer.

Exemplary Networked and Distributed Environments

One of ordinary skill in the art can appreciate that the various embodiments of methods and devices for an infrastructure for information as a service from any platform and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 10:
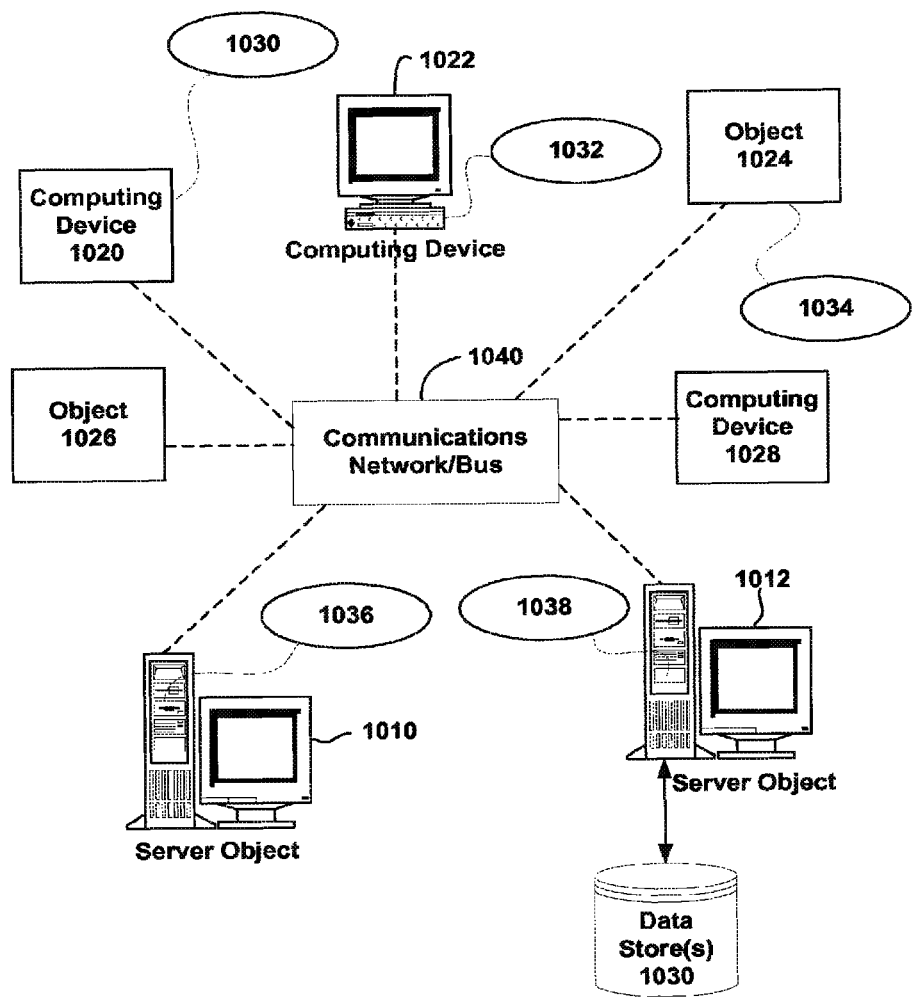
FIG. 10 is a block diagram representing exemplary non-limiting networked environments in which various embodiments described herein can be implemented.

FIG. 10 provides a non-limiting schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038. It can be appreciated that objects 1010, 1012, etc. and computing objects or devices 1020, 1022, 1024, 1026, 1028, etc. may comprise different devices, such as PDAs, digital video disks (dvds), compact discs (cds), audio/video devices, mobile phones, MP3 players, laptops, etc.

Each object 1010, 1012, etc. and computing objects or devices 1020, 1022, 1024, 1026, 1028, etc. can communicate with one or more other objects 1010, 1012, etc. and computing objects or devices 1020, 1022, 1024, 1026, 1028, etc. by way of the communications network 1040, either directly or indirectly. Even though illustrated as a single element in FIG. 10, network 1040 may comprise other computing objects and computing devices that provide services to the system of FIG. 10, and/or may represent multiple interconnected networks, which are not shown. Each object 1010, 1012, etc. or computing objects or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and objects 1010, 1012, etc. can be thought of as servers where servers, etc. provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1040 is the Internet, for example, the servers etc. can be Web servers with which the client computing objects or devices 1020, 1022, 1024, 1026, 1028, etc. communicate via any of a number of known protocols, such as HTTP. Servers etc. may also serve as client computing objects or devices 1020, 1022, 1024, 1026, 1028, etc., as may be characteristic of a distributed computing environment.

Exemplary Computing Device

As mentioned, various embodiments described herein apply to any device wherein it may be desirable to implement one or pieces of an infrastructure for information as a service from any platform. It should be understood, therefore, that handheld, portable and other computing devices and computing objects of all kinds are contemplated for use in connection with the various embodiments described herein, i.e., anywhere that a device may provide some functionality in connection with an infrastructure for information as a service from any platform. Accordingly, the below general purpose remote computer described below in FIG. 11 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 11:
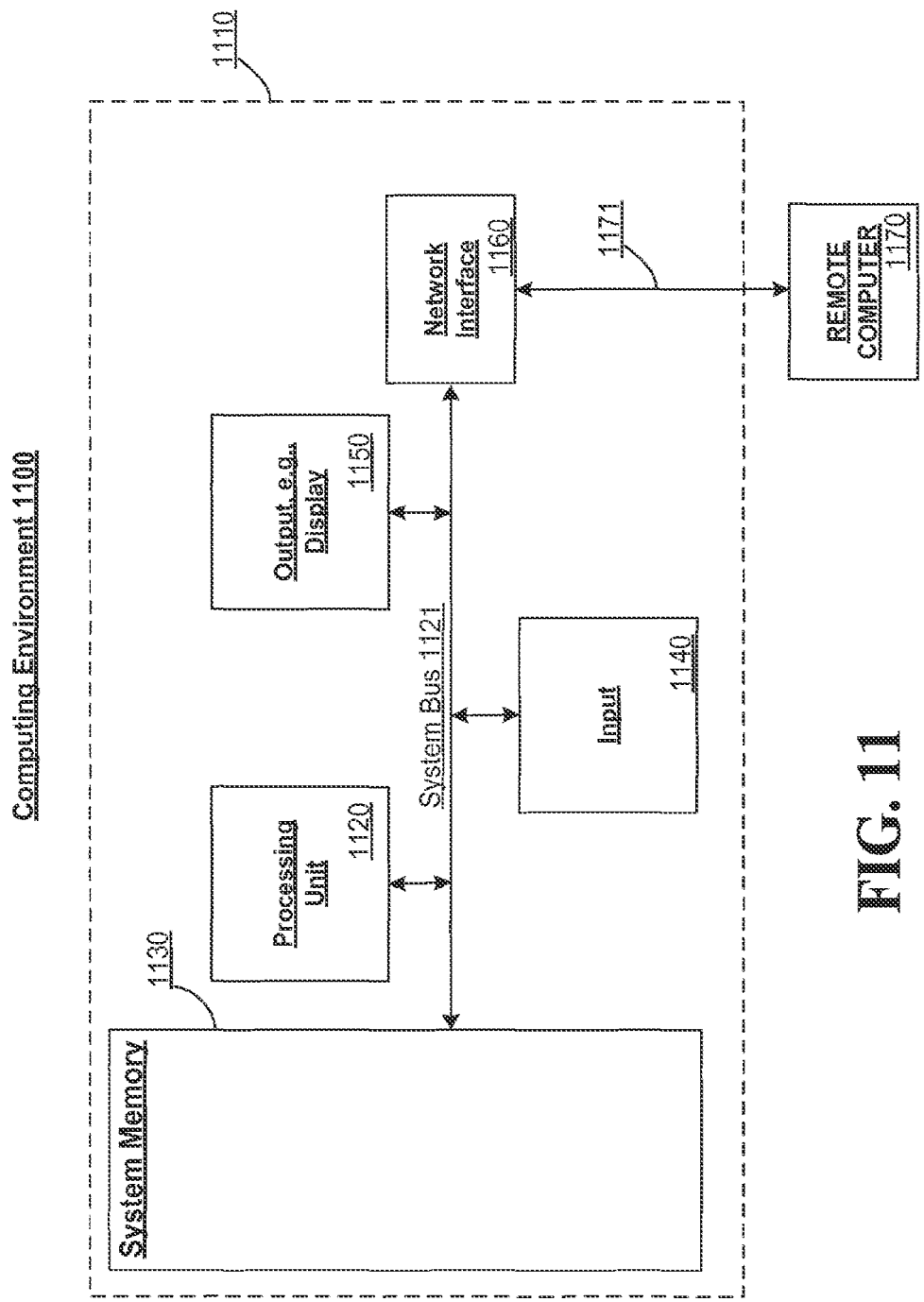
FIG. 11 is a block diagram representing an exemplary non-limiting computing system or operating environment in which one or more aspects of various embodiments described herein can be implemented.

FIG. 11 thus illustrates an example of a suitable computing system environment 1100 in which one or more of the embodiments may be implemented, although as made clear above, the computing system environment 1100 is only one example of a suitable computing environment and is not intended to suggest any limitation as to the scope of use or functionality of any of the embodiments. Neither should the computing environment 1100 be interpreted as having any dependency or requirement relating to any one or combination of components illustrated in the exemplary operating environment 1100.

With reference to FIG. 11, an exemplary remote device for implementing one or more embodiments herein can include a general purpose computing device in the form of a handheld computer 1110. Components of handheld computer 1110 may include, but are not limited to, a processing unit 1120, a system memory 1130, and a system bus 1121 that couples various system components including the system memory to the processing unit 1120.

Computer 1110 typically includes a variety of computer readable media and can be any available media that can be accessed by computer 1110. The system memory 1130 may include computer storage media in the form of volatile and/or nonvolatile memory such as read only memory (ROM) and/or random access memory (RAM). By way of example, and not limitation, memory 1130 may also include an operating system, application programs, other program modules, and program data.

A user may enter commands and information into the computer 1110 through input devices 1140. A monitor or other type of display device is also connected to the system bus 1121 via an interface, such as output interface 1150. In addition to a monitor, computers may also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1171, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to publish, build applications for or consume data in connection with interactions with a cloud or network service.

There are multiple ways of implementing one or more of the embodiments described herein, e.g., an appropriate API, tool kit, driver code, operating system, control, standalone or downloadable software object, etc. which enables applications and services to use the infrastructure for information as a service from any platform. Embodiments may be contemplated from the standpoint of an API (or other software object), as well as from a software or hardware object that facilitates provision of an infrastructure for information as a service from any platform in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. A system comprising:
   at least one element including at least one of (a) one or more processors or (b) hardware logic/electrical circuitry;
   a publication module, implemented using the at least one element, configured to publish content;

a condition generation module, implemented using the at least one element, configured to specify conditions of use that are associated with published content from the publication module, the published content including a plurality of disparate data sets, each data set of the plurality of disparate data sets associated with its own one or more conditions of use;

an enforcement module, implemented using the at least one element, configured to enforce the one or more conditions of use that are associated with each data set; and an access information generator, implemented using the at least one element, configured to generate a report that indicates at least one of one or more services or one or more data sets that are accessed in the published content, the access information generator configured to group information in the report based on a plurality of account keys, at least one of each of the one or more services or each of the one or more data sets associated with an account key of the plurality of account keys.

2. The system of claim 1, wherein the enforcement module is configured to monitor the use of the published content.

3. The system of claim 2, wherein the enforcement module is configured to disallow a disallowed activity indicated by at least one of the one or more conditions of use that are associated with at least one of the plurality of disparate data sets based on the monitored use.

4. The system of claim 3, wherein the enforcement module comprises:
an information rights management module configured to disallow the disallowed activity in contravention of the at least one of the one or more conditions of use that are associated with the at least one of the plurality of disparate data sets.

5. The system of claim 1, wherein the conditions of use that are associated with the published content include a limit with regard to usage of the published content.

6. The system of claim 1,
wherein the report indicates the one or more data sets that are accessed in the published content.

7. The system of claim 6, wherein the report indicates a trend with regard to the use of the published content.

8. The system of claim 1, wherein the published content is from a plurality of types of sources.

9. The system of claim 1, wherein the enforcement module is configured to enforce the one or more conditions of use that are associated with each data set over a plurality of types of platforms.

10. The system of claim 9, wherein the enforcement module is configured to monitor the use of the published content; and
wherein the enforcement module is configured to disallow a disallowed activity indicated by at least one of the one or more conditions of use that are associated with at least one of the plurality of disparate data sets over the plurality of types of platforms based on the monitored use.

11. The system of claim 1, wherein the report indicates the one or more services.

12. A method comprising:
publishing content from a plurality of types of sources, using at least one element that includes at least one of (a) one or more processors or (b) hardware logic/electrical circuitry, to provide published content that includes a plurality of disparate data sets;
specifying conditions of use that are associated with the published content, each data set of the plurality of disparate data sets associated with its own one or more conditions of use; and
enforcing the one or more conditions of use that are associated with each data set.

13. The method of claim 12, wherein enforcing the one or more conditions of use that are associated with each data set comprises:
monitoring the use of the published content.

14. The method of claim 13, wherein enforcing the one or more conditions of use that are associated with each data set further comprises:
disallowing a disallowed activity indicated by at least one of the one or more conditions of use that are associated with a specified data set based on the monitored use.

15. The method of claim 12, wherein the conditions of use that are associated with the published content include a limit with regard to usage of the published content.

16. The method of claim 12, further comprising:
generating a report that indicates at least one of one or more services or one or more data sets that are accessed in the published content.

17. The method of claim 16, wherein the report indicates a trend with regard to the use of the published content.

18. The method of claim 16, wherein generating the report comprises:
generating the report that indicates the one or more services.

19. The method of claim 12, wherein enforcing the one or more conditions of use that are associated with each data set comprises:
enforcing the one or more conditions of use that are associated with each data set over a plurality of types of platforms.

20. A method comprising:
publishing content, using at least one element that includes at least one of (a) one or more processors or (b) hardware logic/electrical circuitry, to provide published content that includes a plurality of disparate data sets;
specifying conditions of use that are associated with the published content, each data set of the plurality of disparate data sets associated with its own one or more conditions of use;
enforcing the one or more conditions of use that are associated with each data set;
generating a report that indicates at least one of one or more services or one or more data sets that are accessed in the published content; and
grouping information in the report based on a plurality of account keys,
at least one of each of the one or more services or each of the one or more data sets associated with an account key of the plurality of account keys.

21. A computer-readable storage device having instructions stored thereon that, when executed, cause a processor to perform functions comprising:
publishing content to provide published content that includes a plurality of disparate data sets;
specifying conditions of use that are associated with the published content, each data set of the plurality of disparate data sets associated with its own one or more conditions of use; and
enforcing the one or more conditions of use that are associated with each data set over a plurality of types of platforms.

22. The computer-readable storage device of claim 21, wherein enforcing the one or more conditions of use that are associated with each data set comprises:
monitoring the use of the published content.

23. The computer-readable storage device of claim 21, wherein enforcing the one or more conditions of use that are associated with each data set further comprises:
   disallowing a disallowed activity indicated by at least one of the one or more conditions of use that are associated with a specified data set based on the monitored use.

24. The computer-readable storage device of claim 21, wherein the conditions of use that are associated with the published content include a limit with regard to usage of the published content.

25. The computer-readable storage device of claim 21, wherein the functions further comprise:
   generating a report that indicates at least one of one or more services or one or more data sets that are accessed in the published content.

26. The computer-readable storage device of claim 25, wherein the report indicates a trend with regard to the use of the published content.

27. The computer-readable storage device of claim 25, wherein the report indicates the one or more services.

28. The computer-readable storage device of claim 21, wherein the published content is from a plurality of types of sources.

29. A computer-readable storage device having instructions stored thereon that, when executed, cause a processor to perform functions comprising:
   publishing content to provide published content that includes a plurality of disparate data sets;
   specifying conditions of use that are associated with the published content, the conditions of use including a limit with regard to usage of the published content, each data set of the plurality of disparate data sets associated with its own one or more conditions of use;
   enforcing the one or more conditions of use that are associated with each data set;
   generating a report that indicates at least one of one or more services or one or more data sets that are accessed in the published content; and
   grouping information in the report based on a plurality of account keys,
   at least one of each of the one or more services or each of the one or more data sets associated with an account key of the plurality of account keys.

* * * * *